H. DE L. MOISE.
SPRINKLING ATTACHMENT FOR GARDEN FAUCETS.
APPLICATION FILED JUNE 2, 1919.
1,338,242. Patented Apr. 27, 1920.
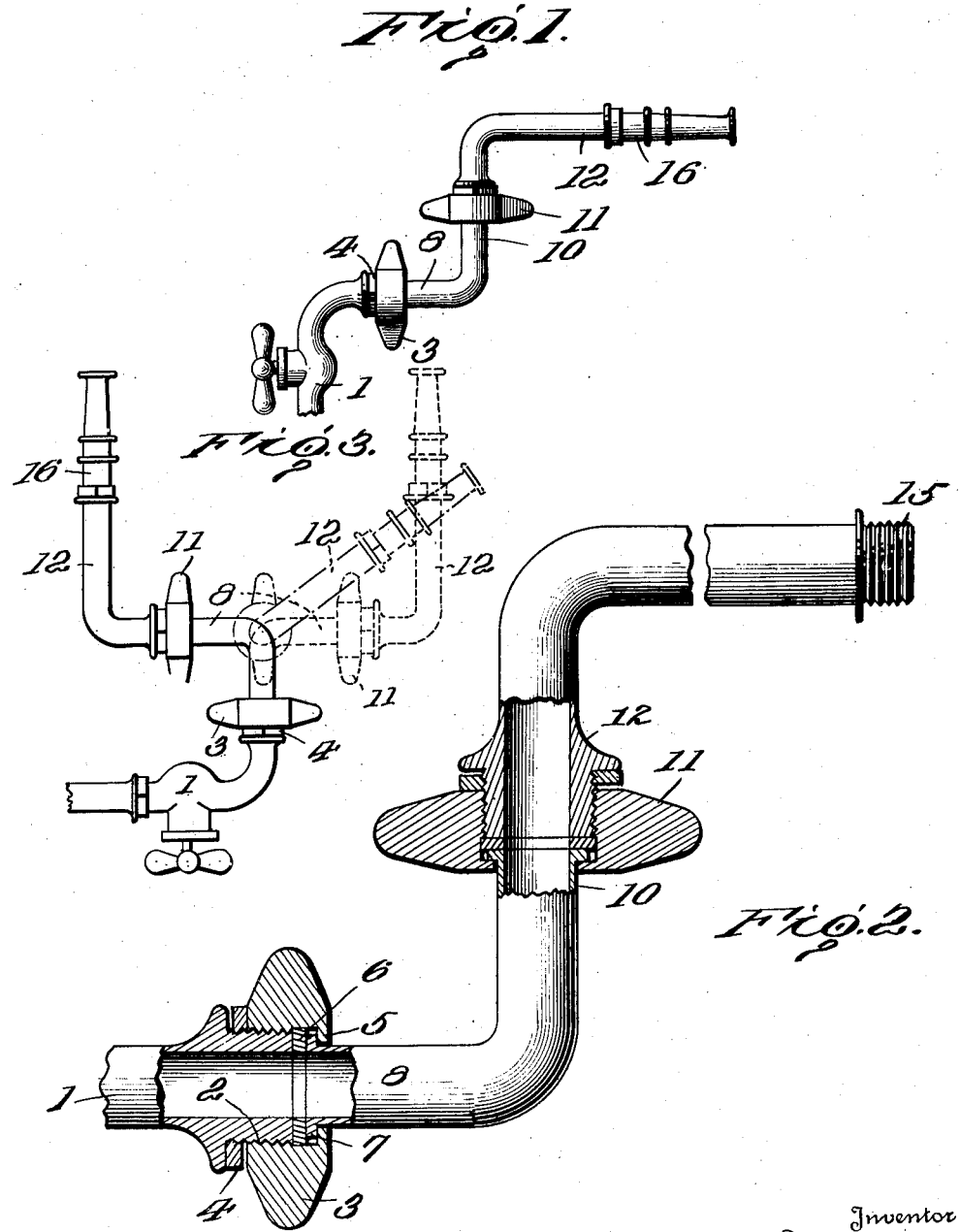

UNITED STATES PATENT OFFICE.

HARMON DE LEON MOISE, OF SUMTER, SOUTH CAROLINA, ASSIGNOR TO THE HOSELESS SPRINKLER COMPANY, A CORPORATION OF SOUTH CAROLINA.

SPRINKLING ATTACHMENT FOR GARDEN-FAUCETS.

1,338,242. Specification of Letters Patent. Patented Apr. 27, 1920.

Application filed June 2, 1919. Serial No. 301,181.

*To all whom it may concern:*

Be it known that I, HARMON D. MOISE, a citizen of the United States, residing at Sumter, in the county of Sumter, State of South Carolina, have invented certain new and useful Improvements in Sprinkling Attachments for Garden-Faucets, of which the following is a description, reference being had to the accompanying drawing, and to the figures of reference marked thereon.

This invention relates to sprinkling nozzles for use in gardens, adapted to be directly attached to the standard type of faucets.

The object of this invention is to provide a simple and inexpensive device which is quickly attachable and detachable to the standard garden faucet and the ordinary standard nozzle for the purpose of delivering a stream of water in any desired direction.

A further object of this invention is to provide a hoseless attachment for the usual garden faucet providing a universally directable stream or spray of water.

In the drawings, which illustrate one embodiment of my invention:—

Figure 1 is a side elevation of the device as connected to a faucet and provided with a garden hose nozzle;

Fig. 2 is a side elevation with parts broken away, showing the universal connection between the nozzle and the faucet. In this view the end of the faucet is shown and the nozzle is omitted; and Fig. 3 is a side elevation of the device as illustrated in Fig. 1, showing the standard faucet and ground connection therefor, with the faucet mouth positioned upwardly so that the attachment connected thereto can be moved in any direction without interference with the water supply pipe.

In general, the invention embraces an elbow-shaped pipe provided with projecting flanges on its two extremities, which flanges are adapted to seat in the interiorly threaded bores of the two nuts which have similarly projecting flanges to engage the projecting flange on the extremity of the pipe, thus permitting the nuts to freely rotate on said pipe but preventing their removal therefrom. Thus, when the wing nut is screwed upon the faucet, it draws the elbow member thereto providing a water-tight joint, which at the same time permits the elbow member to have rotation relative to the faucet.

The other end of the elbow member has a similar connection to an elbow-shaped conduit or pipe which is also provided at its other extremity with an exterior thread to receive the usual standard garden hose nozzle for producing either a spray or a stream of water. The joints at the extremities of the elbow members respectively, being at right angles to one another, provide a universal connection whereby the nozzle can be positioned in any direction. That is to say, the elbow-shaped pipe section attached to the faucet may be manually moved around the center of the discharge opening of the faucet and the second elbow-shaped pipe section may be manually moved around the first pipe section to which it is attached; and thus the nozzle set in any position relative to the faucet.

Referring more particularly to Fig. 2 of the drawings, the end of the standard faucet is indicated at 1 and is provided with a thread 2 adapted to receive thereon the wing nut 3 and any type of lock washer 4, which is in the form of a split ring having reversely twisted open ends, one end engaging the flange on the faucet and the other end engaging the opposed side of the wing nut. This wing nut 3 is constructed with an interiorly threaded recess and an interiorly projecting flange 5, the latter being adapted to engage an outwardly projecting flange 7 on the extremity of the elbow conduit 8. Within the recess between the end of the threaded portion thereof and the inwardly projecting flange 5, there is located the usual washer 6 of rubber of any suitable material for forming a water-tight joint. As shown, the exterior diameter of this washer is greater than the interior diameter of the threaded bore of the nut so that the washer is firmly held in its seat at all times. When the wing nut 3 is rotated upon the threaded shank 2, it provides a water-tight joint between the two members, at the same time permitting the elbow 8 to be rotated relative to the faucet, the lock washer 4 holding the nut 3 from unscrewing.

The other extremity of the elbow 8 is provided with a flanged end for engagement in a recess of a wing nut 11 which in turn receives the threaded end of a conduit 12. Inasmuch as this connection is similar to that already described, no further mention will be made except to say that the plane of this connection lies at right angles to the first-mentioned connection. The conduit 12 constitutes a second elbow having a threaded portion 15 to receive the standard garden nozzle.

It has been found that a device of this character is more advantageous than the ordinary hose and nozzle connection with the faucet for use in a garden and elsewhere, since this attachment may be quickly connected to the standard faucet and the standard nozzle, and, by means of the universal connections, the water may be directed to any point. The force of the discharge may be regulated not only by regulating the nozzle, but also by opening or closing the valve in the faucet so that a sufficiently slight force of the water is insured for sprinkling plants or other objects close to the water supply pipe, and a greater force may be produced if it is desired to sprinkle plants or other objects at a greater distance from the water supply pipe.

The faucet itself may be given a half rotation, as shown in Fig. 3, in order to permit its threaded end to stand vertically, in which case, by means of this attachment, the stream can be given universal directability without the device coming into contact with the water supply pipe. Furthermore, by judicious placing of a number of faucets, the entire garden can be watered with this device, which can be disconnected from one faucet and connected to others thereby doing away with the necessity of a hose, to the use of which numerous objections exist.

It is obvious that various modifications in this device may be made within the scope of the appended claims.

Having thus described my invention, what I claim as new and desire to secure by Letters-Patent is:—

1. A sprinkling attachment comprising an elbow-shaped pipe section, water-tight means for detachably and directly connecting said elbow-shaped pipe section to a faucet, including a threaded member and an elastic packing, whereby said pipe section may be freely turned about its connection and frictionally held in adjusted position, a second elbow-shaped pipe section, external water-tight means for connecting said pipe sections including a threaded member and an elastic packing, whereby said second elbow-shaped pipe section may be freely turned around the end of the pipe section to which it is connected and frictionally held in adjusted position, said pipe sections having a free and unobstructed water passage for all adjustments of said pipe sections, and means for detachably and directly connecting a nozzle to the outer end of said second pipe section, said pipe sections and connecting means permitting the nozzle to be set in any position relative to the faucet.

2. A sprinkling attachment comprising an elbow-shaped pipe section having a flange at one end thereof, a flanged wing nut and an elastic packing for forming a water-tight connection between said flanged end of the pipe section and the faucet, permitting said pipe section to be adjusted about its connection to the faucet and frictionally held in adjusted position, a second elbow-shaped pipe section, means for connecting said pipe sections including a flange on one of said pipe sections, a wing nut threaded to the other pipe section, and an elastic packing whereby a water-tight connection is formed between said pipe sections, permitting the second elbow pipe section to be turned about the first-named pipe section and frictionally held in adjusted position, and means for detachably and directly connecting a nozzle to the outer end of said second pipe section, said pipe sections and connecting means permitting the nozzle to be set in any position relative to the faucet.

3. A sprinkling attachment comprising an elbow-shaped pipe section, water-tight means for detachably and directly connecting said elbow-shaped pipe section to a faucet in any adjusted position of the latter, including a threaded member and an elastic packing, whereby said pipe section may be freely turned about its connection and frictionally held in adjusted position, a second elbow-shaped pipe section, external water-tight means for connecting said pipe sections including a threaded member and an elastic packing, whereby said second elbow-shaped pipe section may be freely turned around the end of the pipe section to which it is connected and frictionally held in adjusted position, said pipe sections having a free and unobstructed water passage for all adjustments of said pipe sections, and means for detachably and directly connecting a nozzle to the outer end of said second pipe section, said pipe sections and connecting means permitting the nozzle to be set in any position relative to the faucet.

In testimony whereof, I affix my signature.

HARMON DE LEON MOISE.